Aug. 12, 1924.
C. E. SEARCH
LATHE
Original Filed March 25, 1918
1,504,519
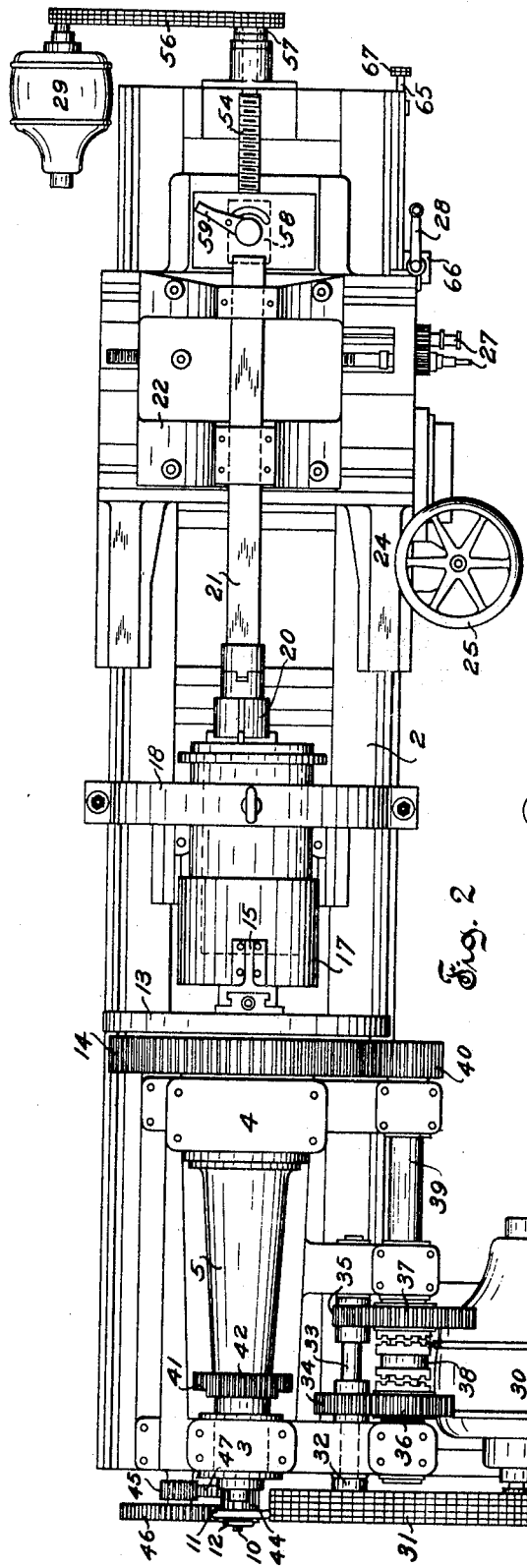
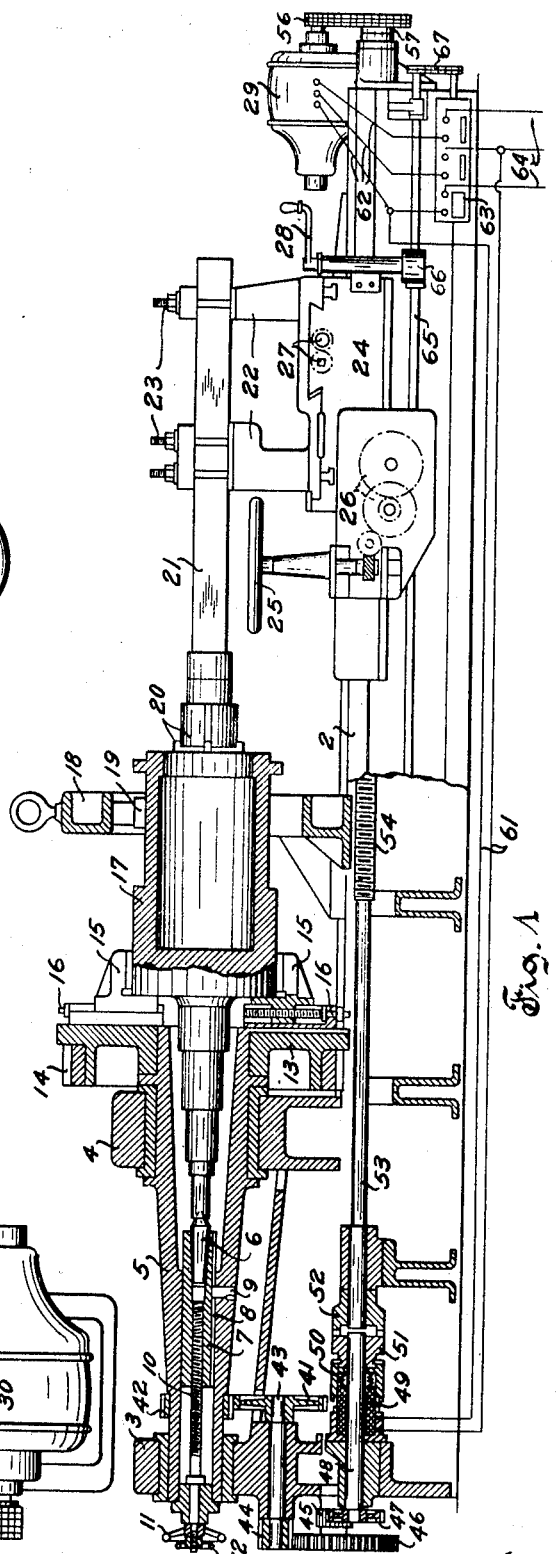

Patented Aug. 12, 1924.

1,504,519

UNITED STATES PATENT OFFICE.

CHARLES ED. SEARCH, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

LATHE.

Original application filed March 25, 1918, Serial No. 233,393. Divided and this application filed March 20, 1922. Serial No. 544,994.

*To all whom it may concern:*

Be it known that CHARLES EDWIN SEARCH, a citizen of the United States, residing at Milwaukee, in the county of Milwaukee and State of Wisconsin, has invented a certain new and useful Improvement in Lathes, of which the following is a specification.

This invention relates to improvements in the construction and operation of machine tools and has particular relation to improvements in the construction of turning and boring lathes.

The object of the invention is to provide a lathe which is simple in construction and efficient in operation. One of the more specific objects is to provide simple, compact and efficient mechanism for centering and driving the bodies to be turned or bored. Another specific object is to provide simple and efficient means for manipulating the cutting tool or its carrier.

It has heretofore been customary in the construction and operation of turning and boring lathes, to provide either a face plate and one or more dogs or a set of two or more centering jaws for driving the object to be machined. In cases where driving dogs are utilized, it is customary to also utilize a live center which rotates with the driving means and engages the body being machined adjacent the axis; but when the combined driving and centering jaws are employed it is ordinarily unnecessary to utilize a live center in addition to the centering jaws.

In turning or boring an elongated body having a portion of relatively small diameter adjacent an end thereof and a portion of relatively large diameter remote from such end, such for instance as a steam turbine spindle, it has heretofore been customary to utilize the ordinary driving dogs and a live center associated with the small end of the body in order to rotate the same. Due to the relatively great length of such a body combined with the application of the driving power to an end portion thereof of relatively small diameter, it has been found that when machining portions of the body remote from the drive, there is considerable twisting in the body itself this twisting causing chattering and preventing production of a smooth finished surface. In order to eliminate this twisting and consequent chattering of the body, the present invention contemplates the provision of a live center coacting with an end of the body and adjacent its axis, and a plurality of mutually reacting driving jaws coacting with a portion of the body remote from the center and having relatively large diameter. By making the live center adjustable longitudinally of the axis of rotation, the gripping jaws may be brought into engagement with any desirable portion of the body. By making the jaws adjustable transversely of the axis of rotation in order to grip the body, bodies of various diameters may be gripped.

The present invention further contemplates the provision of means for quickly retracting the tool after a cut has been completed and without expenditure of excess power. This result is accomplished by providing means in the form of a relatively small high speed motor which may be connected with the tool carriage upon completion of a cut while the main drive motor is simultaneously automatically disconnected from the tool carriage.

This application is a division of application, Serial No. 233,393, filed March 25, 1918.

A clear conception of an embodiment of the invention may be had by referring to the drawing accompanying and forming a part of this specification in which like reference characters designate the same or similar parts in the various views.

Fig. 1 is a side elevation, partly in sections of a chamber boring lathe showing a wiring diagram and mechanism for effecting rapid retraction of the tool.

Fig. 2 is a top view of a chamber boring lathe such as illustrated in Fig. 1.

While the invention is disclosed herein as applied specifically to a chamber boring lathe especially adapted to bore the interiors of steam turbine spindles, it is not intended to limit the invention by such disclosure.

The chamber boring lathe comprises in general a main frame or bed 2 provided with a pair of spaced bearings 3, 4 adjacent the head end thereof, and having parallel guideways upon which a tool carriage 24 is slidable longitudinally of the bed 2. Rotatably supported in the bearings 3, 4, is a driving head 5 comprising an elongated hollow portion extending longitudinally of the bed 2 and a jaw carrier 13 forming a flange extending transversely of the lathe bed. Within the elongated hollow portion of the head 5 and coaxial with the axis of rotation thereof, is mounted an adjustable live center 6 which is movable to different positions along the axis of rotation, but which at all times remains between the bearings 3, 4 and on the side of the bearing 4 opposite to the jaw carrier 13. The center 6 is mounted in a sleeve shaped carrier 7 slidably fitting a bore in the head 5 and provided with a longitudinal groove 8 coactable with a guide pin 9 in order to prevent rotation of the carrier 7. The carrier 7 is provided for a portion of its length with a tapered bore within which the center 6 is located, and has for the remainder of its length a threaded bore the threads of which coact with an adjusting screw 10. The adjusting screw 10 has a collar which abuts a bearing cap secured to the end of the head 5, and is provided with a hand wheel 11 by means of which the screw 10 may be rotated in order to shift the center 6. The screw 10 may be locked in any desired position of adjustment by means of a locking wheel 12 which is adapted to jam the hand wheel 11 against the adjacent bearing cap.

The lathe is driven by means of a main motor 30 the rotary motion of which is transmitted through a chain drive 31 to a sprocket 32 mounted on an end of a countershaft 33 which is supported in bearings secured to the lathe bed 2. Mounted upon the countershaft 33 are two spur gears 34, 35 of different diameters. These spur gears 34, 35 mesh with spur gears 36, 37 respectively, secured to a countershaft 39 which is also mounted in bearings secured to the lathe bed 2. A jaw clutch 38 manipulable by a lever in the usual manner, is mounted between the gears 36, 37 and is adapted to interchangeably interlock with the hubs of these gears thereby making either the set of gears 34, 36 or the set of gears 35, 37, effective in driving the countershaft 39. A spur gear 40 is attached to an end of the countershaft 39 and meshes with a spur gear 14 which is secured to the jaw carrier 13 of the driving head 5. With this arrangement of gearing it will be apparent that the motor 30 is capable of interchangeably transmitting motion at two speeds to the head 5 through the chain drive 31, sprocket 32, countershaft 33, gears 34, 36, or gears 35, 37, jaw clutch 38, countershaft 39 and gears 40, 14.

The head 5 is provided at a point intermediate the bearings 3, 4, with a spur gear 42 which meshes with a spur gear 41 secured to an end of the countershaft 43. To the opposite end of the countershaft 43 is secured a pinion 44 which meshes with a spur gear 46. A pinion 45 is drivingly connected with the gear 46 and meshes with a spur gear 47 which is secured to the clutch section 48 of the carriage feed shaft. The carriage feed shaft is mounted in bearings in the lathe bed 2 below the driving head and tool and comprises the clutch section 48 and a threaded section 53 having feed threads 54 thereon. The sections 48, 53 of the feed shaft are adapted to be drivingly connected by means of a magnetic clutch comprising a solenoid winding 49, a solenoid sleeve 50 and a pair of jaws 51, 52. Secured to the extreme rear end of the feed shaft section 53 is a sprocket 57 coacting with a drive chain 56 and forming a driving connection with the auxiliary motor 29. This motor 29 is of considerably smaller capacity than the main drive motor 30 and is preferably operable at considerably higher speed.

The tool carriage 24 is slidable longitudinally of the lathe bed along the parallel guide-ways formed on the bed 2, either by the use of an ordinary hand wheel 25 and gearing 26, or by means of the motor driven threaded portion 53 of the carriage feed shaft. The carriage 24 may be connected with the feed threads 54 of the shaft portion 53 by means of a clutch device 58 of any ordinary construction operable by means of a clutch actuating lever 59. Mounted upon the carriage 24 is a tool carriage top plate 22 which is adjustable transversely of the carriage 24 and of the lathe bed 2 by means of an adjusting device 27 also of usual construction. The tool supporting bar 21 to the end of which a boring tool 20 is secured, is adjustably attached to the top plate 22 by means of clamping bolts 23.

Mounted upon the tool carriage 24 is a quick reverse control mechanism comprising a lever 28 and a control device 66 operable by the lever. The control device 66 is adapted to grip and to rotate the shaft 65 which extends longitudinally of the lathe bed 2, upon manipulation of the lever 28. Rotation of the shaft 65 is transmitted through a chain drive 67 to a controller 63 having three sets of terminals and a similar number of contact plates adapted to connect the terminals of the several sets upon rotation of the controller drum. The main line 64 has three wires which are connected to corresponding terminals of each set. The other terminals of the sets are connected with the auxiliary motor 29 by means of wires 62. The solenoid winding 49 of the magnetic clutch, is connected by wires 61 with one of the wires of the main line 64, and with one of the wires 62 leading to the motor, so that when the controller drum is in neutral position as shown in Fig. 1, the winding 49 is deenergized. The controller contact plate which completes the circuit of the magnetic clutch is so constructed that the initial movement of controller drum will close the magnetic clutch circuit and thereby disconnect the jaws 51, 52 before the circuit of the auxiliary motor 29 is completed.

The body 17 which in the present case is illustrated as a steam turbine spindle the interior chamber of which is to be finished by boring, is gripped by means of transversely adjustable jaws 15 mounted upon the jaw carrier 13. The jaws 15 are movable to grip the body 17 by means of jaw adjusting rods 16 of usual construction. The jaws 15 preferably grip body 17 so as to mutually react, thereby eliminating the necessity of providing other means for urging the body to be machined against the jaws in order to produce a driving connection. In order to relieve the jaws 15 from excessive pressure due to the overhang of the body 17, an adjustable support 18 of usual form having shoes 19 which engage the body 17, is mounted upon the lathe bed 2 adjacent the overhanging end of the body 17. In practice, gearing and other movable parts which are liable to subject the operator to danger of injury, are provided with suitable housings, such housings having been omitted from the present disclosure for the sake of clearness.

During the normal operation of the lathe, the body 17 is properly centered within the driving head 5 and the gripping jaws 15 are adjusted to produce a driving connection. After the live center 6 has been properly adjusted to coact with the end of the body 17, the adjusting screw 10 is locked in place by means of the locking wheel 12. The driving head 5 is then rotated at the desired speed by means of the main motor 30 through the jaw clutch 38, thereby rotating the body 17. Rotation of the head 5 is transmitted to the threaded section 53 of the feed shaft through the magnetic clutch, providing the circuit of the solenoid winding 49 is interrupted as shown in Fig. 1. The tool carriage 24 may then be fed forward toward the driving head 5 by manipulation of the lever 59 and the clutch device 58, thereby feeding the tool 20 forward at a relatively slow rate of speed. During rotation of the feed shaft section 53 by the main motor 30, the rotor of the auxiliary motor 29 is being slowly rotated in a direction reversed from its normal direction of rotation.

If it is desired to reverse the direction of movement of the tool carriage 24, this may be done either manually by disconnecting the clutch device 58 and manipulating the hand wheel 25, or automatically without disconnecting the clutch device 58 by manipulating the control lever 28. As the control lever 28 is operated rotary motion is transmitted through the control device 66, shaft 65, and chain drive 67 to the controller 63. The initial movement of the controller drum closes the circuit of the solenoid winding 49 causing the sleeve 50 to move toward the left, compressing the coil springs and withdrawing the jaw 51 from the jaw 52 thus breaking the driving connection to the shaft section 53. Continued rotation of the controller drum closes the circuit from the main line 64 through the wires 62 to the auxiliary motor 29, causing the motor 29 to rotate the shaft section 53 through the chain drive 67 and sprocket 57, in a direction reversed from that transmitted to the shaft section 53 by the main motor 30. This rotation of the threaded shaft section 53 is transmitted through the clutch device 58 to the tool carriage 24 and causes this carriage to move away from the driving head 5. Due to the fact that the auxiliary motor 29 is preferably a relatively high speed motor, the carriage 24 and tool 20 will move away from the driving head 5 at considerably higher speed than they move toward the head.

It will thus be noted that due to the fact that the body 17 is gripped by the jaws 15 at a portion of the body having relatively large diameter and located relatively near the cutting tool, twisting and consequent vibration of the body 17 is eliminated and a smooth finished surface is attainable. The location of the bearing 4 relatively near the jaws 15 and between these jaws and the live center 6, also produces a mechanism which is exceedingly stable since the center of gravity of the body 17 is thus brought close to the bearing. The provision of an auxiliary motor 29 of relatively small capacity and of high speed for reversing the movement of the tool carriage 24, reduces the power consumption to a minimum and also saves time. By producing a device which automatically disconnects the carriage drive from one motor and connects this drive with the other motor, reversal of the tool carriage 24 may be quickly and effectively accomplished.

It should be understood that it is not desired to limit this invention to the exact details of construction herein shown and described for various modifications within the scope of the appended claims may occur to a person skilled in the art.

It is claimed and desired to secure by Letters Patent:

1. In a lathe, a work support, a tool support, a feed shaft for said tool support, a motor cooperable with said shaft to move said tool support relatively to said work support in one direction, and an independent motor cooperable with said shaft to move said tool support in the opposite direction.

2. In a lathe, a tool, a motor for moving said tool in one direction, a motor for moving said tool in the opposite direction, and means for disconnecting said tool from one of said motors and for effecting movement thereof by the other.

3. In a lathe, a tool, a motor for moving said tool in one direction, a motor for moving said tool in the opposite direction, and means for simultaneously disconnecting said tool from one of said motors and for starting the other of said motors to effect movement of said tool.

4. In a lathe, a tool, a motor for moving said tool in one direction, a motor for moving said tool in the opposite direction, means for disconnecting said tool from one of said motors and means operable subsequently to disconnection of said tool from one motor for effecting movement of said tool by the other motor.

5. In a lathe, a work support, a tool support, a motor for manipulating said work support and for moving said tool support relatively to said work support in a predetermined direction, and a second motor for alternately moving said tool support in another direction.

6. In a lathe, a work support, a tool support, a motor for rotating said work support and for producing rectilineal movement of said tool support in one direction, and a second motor for producing rectilineal movement of said tool support in the opposite direction.

7. In a lathe, a work support, a tool support, a motor for manipulating said work support and for slowly moving said tool support in one direction, and a second motor for rapidly moving said tool support in the opposite direction.

8. In a lathe, a tool support, a reversely rotatable feed shaft for said support, a motor having a rotor detachably associated with said shaft to move said support in one direction, and a motor having a rotor permanently connected with said shaft and operable to move said support in the opposite direction.

9. In a lathe, a tool support, a threaded shaft reversely rotatable to move said support in opposite directions, a motor having a permanent driving connection with said shaft, a second motor, and a clutch for drivingly connecting said second motor with said shaft.

10. In a lathe, a tool support, a threaded shaft for moving said support in opposite directions, a motor having a permanent driving connection with one end of said shaft, and a second motor having a releasable driving connection with the opposite end of said shaft.

11. In a lathe, a work support, a tool support, a reversely rotatable element for moving said tool support in opposite directions, a motor for manipulating said work support and for rotating said element in one direction, and a second motor for rotating said element in the opposite direction.

12. In a lathe, a rotary work support, a reciprocable tool support, a reversely rotatable element connectible with said tool support to reciprocate the same, a single motor for rotating said work support and for rotating said element in one direction, and a second motor rotating said element in the opposite direction.

13. In a lathe, a rotary work support, a movable tool support, a rotary element connectible with said tool support to move the same, a slow speed motor, gearing connecting said work support and said motor, mechanism including a clutch for connecting said element and said motor, and a high speed motor for rotating said element when said clutch is disconnected.

14. In a lathe, a rotary work support, a movable tool support, a rotary element reversely rotatable to move said tool support in opposite directions, a motor drivingly connectible with said work support, a magnetic clutch connection between said motor and said element for rotating said element in one direction, a relatively high speed motor adapted to rotate said element in the reverse direction, and a permanent power transmitting connection between said high speed motor and said element.

In testimony whereof, the signature of the inventor is affixed hereto.

CHARLES ED. SEARCH.